United States Patent
Shan

(10) Patent No.: US 10,852,426 B2
(45) Date of Patent: Dec. 1, 2020

(54) SYSTEM AND METHOD OF UTILIZING A LIDAR DIGITAL MAP TO IMPROVE AUTOMATIC DRIVING

(71) Applicant: Tiejun Shan, Plano, TX (US)

(72) Inventor: Tiejun Shan, Plano, TX (US)

(*) Notice: Subject to any disclaimer, the term of this patent is extended or adjusted under 35 U.S.C. 154(b) by 0 days.

(21) Appl. No.: 16/804,987

(22) Filed: Feb. 28, 2020

(65) Prior Publication Data
US 2020/0200896 A1 Jun. 25, 2020

Related U.S. Application Data

(63) Continuation-in-part of application No. 16/248,761, filed on Jan. 15, 2019, now Pat. No. 10,795,014, and a continuation-in-part of application No. 16/242,958, filed on Jan. 8, 2019, application No. 16/804,987, which is a continuation-in-part of application No. 16/249,351, filed on Jan. 16, 2019, now Pat. No. 10,794,988, application No. 16/804,987, which is a continuation-in-part of application No. 16/252,257, filed on Jan. 18, 2019, application No. 16/804,987, which is a continuation-in-part of application No. 16/252,377, filed on Jan. 18, 2019, application No. 16/804,987, which is a continuation-in-part of application No. 16/271,567, filed on Feb. 8, 2019, now Pat. No. 10,794,989, application No.
(Continued)

(51) Int. Cl.
| | |
|---|---|
| *G01S 13/931* | (2020.01) |
| *G05D 1/02* | (2020.01) |
| *G08G 1/0967* | (2006.01) |
| *G08G 1/01* | (2006.01) |

(52) U.S. Cl.
CPC ......... *G01S 13/931* (2013.01); *G05D 1/0231* (2013.01); *G05D 1/0285* (2013.01); *G08G 1/096725* (2013.01); *G01S 2013/9315* (2020.01); *G01S 2013/9316* (2020.01); *G08G 1/0116* (2013.01)

(58) Field of Classification Search
CPC ... G01S 13/931; G05D 1/0231; G05D 1/0285
USPC .................................. 342/107, 106, 113, 70
See application file for complete search history.

(56) References Cited

U.S. PATENT DOCUMENTS

| | | | |
|---|---|---|---|
| 2017/0073070 A1* | 3/2017 | Xing | B60F 3/0061 |
| 2017/0123428 A1* | 5/2017 | Levinson | G01S 13/86 |

(Continued)

*Primary Examiner* — Bo Fan

(57) ABSTRACT

A system and method of utilizing a LIDAR digital map improves automatic device by allowing a self-driving vehicle to safely make a sharp turn or pass by an environmental obstacle. The system includes at least one passenger vehicle, an automated driving system, and at least one roadside device. Road-condition data is continuously captured with a passenger LIDAR system and a passenger camera device of the passenger vehicle. The road-condition data is compared to LIDAR profiles with an automatic driving system in order to identify a matching profile. A roadside device is pinged if at least one non-line-of-sight condition is detected in the road-condition data. Hidden target data is retrieved from the roadside device to the automated driving system. The automated driving system compiles a set of driving instructions. The set of driving instructions is executed with the passenger vehicle through the automated driving system.

9 Claims, 19 Drawing Sheets

Related U.S. Application Data

16/804,987, which is a continuation-in-part of application No. 16/276,288, filed on Feb. 14, 2019, now Pat. No. 10,805,022, application No. 16/804,987, which is a continuation-in-part of application No. 16/672,417, filed on Nov. 1, 2019, application No. 16/804,987, which is a continuation-in-part of application No. 16/676,428, filed on Nov. 6, 2019.

(60) Provisional application No. 62/617,962, filed on Jan. 16, 2018, provisional application No. 62/616,844, filed on Jan. 12, 2018, provisional application No. 62/617,723, filed on Jan. 16, 2018, provisional application No. 62/618,735, filed on Jan. 18, 2018, provisional application No. 62/619,204, filed on Jan. 19, 2018, provisional application No. 62/628,436, filed on Feb. 9, 2018, provisional application No. 62/630,416, filed on Feb. 14, 2018, provisional application No. 62/754,448, filed on Nov. 1, 2018, provisional application No. 62/756,318, filed on Nov. 6, 2018, provisional application No. 62/817,990, filed on Mar. 13, 2019.

(56) References Cited

U.S. PATENT DOCUMENTS

| | | | |
|---|---|---|---|
| 2017/0270375 A1* | 9/2017 | Grauer | G06K 9/6293 |
| 2017/0371348 A1* | 12/2017 | Mou | G01S 17/86 |
| 2018/0012370 A1* | 1/2018 | Aghamohammadi | G06T 7/50 |
| 2018/0012496 A1* | 1/2018 | Hasberg | B60W 40/04 |
| 2019/0107623 A1* | 4/2019 | Campbell | G01S 17/931 |

* cited by examiner (A) Providing at least one passenger vehicle, an automated driving system, and at least one roadside device, wherein the passenger vehicle and the automated driving system are communicably coupled to each other, and wherein the passenger vehicle comprises a passenger LIDAR system and a passenger camera device, and wherein a LIDAR digital map is stored on the automated driving system, and wherein the LIDAR digital map includes a plurality of LIDAR profiles and a plurality of geospatial points, and wherein each LIDAR profile is associated to a corresponding point from the plurality of geospatial points (B) Continuously capturing road-condition data with the passenger LIDAR system and the passenger camera device (C) Comparing the road-condition data to each LIDAR profile with the automated driving system in order to identify a matching profile from the plurality of LIDAR profiles (D) Pinging the roadside device, if at least one non-line-of-sight condition is detected in the road-condition data and/or the corresponding point of the matching profile with the automated driving system

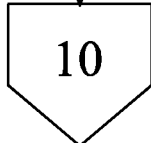

FIG. 9

SYSTEM AND METHOD OF UTILIZING A LIDAR DIGITAL MAP TO IMPROVE AUTOMATIC DRIVING

The current application claims a priority to the U.S. Provisional Patent application Ser. No. 62/817,990 filed on Mar. 13, 2019.

The current application also claims a priority to a U.S. non-provisional application Ser. No. 16/676,428 filed on Nov. 6, 2019. The U.S. non-provisional application Ser. No. 16/676,428 claims a priority to a U.S. provisional application Ser. No. 62/756,318 filed on Nov. 6, 2018.

The current application also claims a priority to a U.S. non-provisional application Ser. No. 16/672,417 filed on Nov. 1, 2019. The U.S. non-provisional application Ser. No. 16/672,417 claims a priority to the U.S. Provisional Patent application Ser. No. 62/754,448 filed on Nov. 1, 2018.

The current application also claims a priority to a U.S. non-provisional application Ser. No. 16/276,288 filed on Feb. 14, 2019. The U.S. non-provisional application Ser. No. 16/276,288 claims a priority to the U.S. Provisional Patent application Ser. No. 62/630,416 filed on Feb. 14, 2018.

The current application also claims a priority to a U.S. non-provisional application Ser. No. 16/271,567 filed on Feb. 8, 2019. The U.S. non-provisional application Ser. No. 16/271,567 claims a priority to the U.S. Provisional Patent application Ser. No. 62/628,436 filed on Feb. 9, 2018.

The current application also claims a priority to a U.S. non-provisional application Ser. No. 16/252,377 filed on Jan. 18, 2019. The U.S. non-provisional application Ser. No. 16/252,377 claims a priority to the U.S. Provisional Patent application Ser. No. 62/619,204 filed on Jan. 19, 2018.

The current application also claims a priority to a U.S. non-provisional application Ser. No. 16/252,257 filed on Jan. 18, 2019. The U.S. non-provisional application Ser. No. 16/252,257 claims a priority to the U.S. Provisional Patent application Ser. No. 62/618,735 filed on Jan. 18, 2018.

The current application also claims a priority to a U.S. non-provisional application Ser. No. 16/249,351 filed on Jan. 16, 2019. The U.S. non-provisional application Ser. No. 16/249,351 claims a priority to a U.S. provisional application Ser. No. 62/617,723 filed on Jan. 16, 2018.

The current application also claims a priority to a U.S. non-provisional application Ser. No. 16/248,761 filed on Jan. 15, 2019. The U.S. non-provisional application Ser. No. 16/248,761 claims a priority to a U.S. provisional application Ser. No. 62/617,962 filed on Jan. 16, 2018.

FIELD OF THE INVENTION

The present invention generally relates to a digital mapping system. More specifically, the present invention is a system and method of utilizing a LIDAR digital map to improve automatic driving.

BACKGROUND OF THE INVENTION

Sensor technology, such as LIDAR for automatic diving vehicle has been a fast-growing area of interest for automobile and sensor industry. So does digital camera that become common vehicle equipment. Those markets are among the fastest growing tech sectors in the world. Recently, the development of auto LIDAR provides powerful sensing tools for ADAS and automatic driving vehicle. Sensor systems are the focus of automobile manufacture and Artificial Intelligent (AI) research and development industry.

Digital mapping can provide three dimensional geographic characteristics of road conditions. Digital map is widely used in automobile navigation nowadays. Digital map is an enabler to make automatic driving possible. Digital map, GPS, with AI technology, in conjunction with auto sensor system can provide autopilot role in automatic driving and ADAS.

LIDAR is one of the sensing devices needed for ADAS and automatic driving. LIDAR transmit laser beam to detect sounding object of a vehicle. By scanning its transmitted laser beams, it forms images of the objects that it is "illuminating" targets by receiving the reflected beams. LIDAR is one of the sensors that detect objects that are surrounding the vehicles to enable autonomous driving vehicle possible. LIDAR is based on laser beam scanning to construct images of surrounding object. Laser beam need direct light pass, i.e. line-of-sight, to get reflections from the objects to detect targets and to form target's images.

However, automatic driving vehicles faces great challenges for many geographic road features both in rural and urban areas, where line-of-sight condition cannot meet, such as sharp turn roads, as illustrated in FIG. 1 and FIG. 2. In these road locations, LIDAR would fail to perform its sensing functions.

Digital video camera is another sensing devices needed for ADAS and automatic driving. Digital camera and video camera both need line-of-sight condition. They face the same challenge as LIDAR for road conditions as examples shown in FIG. 1 and FIG. 2.

All these sensors are working in the assumption that the light wave has direct pass from LIDAR scanners to targets. i.e. line-of-sight, to the target, and receive the reflected light wave so that it can directly pass to the sensor receiver. However, there are many road geophysical features that make the line-of-sight detection impossible. These unfavorable geographic characteristics are obstacles for automatic driving further advance. For example, as illustrated in FIG. 1, a sharp turn in a mountainous highway, one side is a steep hill and the other side is a cliff, the wave of light transmitted by the LIDAR cannot directly illuminate on the incoming cars of both direction that are "hiding" on the other side of the sharp turn. The automobile video camera will not be able to see the hiding targets on the other side of the turn. It is difficult to receive any LIDAR laser wave reflection from the vehicles that are on the other side of the hill. The LIDAR laser wave reflects from the incoming vehicle can only be detected when the LIDAR wave has a direct pass to the incoming vehicles. In this situation, the auto LIDAR, the video camera will not be able to detect the upcoming danger. Therefore, detectability of the target is greatly compromised. FIG. 2 illustrates an urban road geometry, where there is no direct path for LIDAR laser light beam, and the targets are out of video camera's vision. Therefore, it also presents a greater challenge for LIDAR target detection and digital video camera to capture a target hiding in a turn.

This invented sensor digital map will provide solutions for LIDAR and digital camera to detect invisible targets in a non-line-of-sight. It is an urgent need to provide profiling of light wave propagation profile on a digital map. It is a powerful tool to meet the challenge that the LIDAR and digital camera face on a non-line-of-sight roads.

Develop Sensor Digital map and its technology would play a key role in developing automatic driving vehicles technology, as important as digital maps and GPS technology.

BRIEF DESCRIPTION OF THE DRAWINGS

FIG. 9 is a flowchart illustrating the overall process of the method of the present invention.

DETAIL DESCRIPTIONS OF THE INVENTION

All illustrations of the drawings are for the purpose of describing selected versions of the present invention and are not intended to limit the scope of the present invention.

In reference to FIGS. 1 through 19, the present invention is a system and method of utilizing a LIDAR digital map to improve automatic driving. With reference to FIG. 9, the system of the present invention includes at least one passenger vehicle, an automated driving system, and at least one roadside device (Step A). The passenger vehicle is a self-driving vehicle used by at least one passenger. The automated driving system allows the passenger vehicle to drive without human input. The roadside device aids the passenger vehicle to make safe turns by communicating with the automated driving system. The passenger vehicle and the automated driving system are communicably coupled to each other in order for the passenger vehicle is safely drive without human input. The passenger vehicle comprises a passenger LIDAR system and a passenger camera device. The passenger LIDAR system is a standard light detection and ranging system that is commonly used in self-driving vehicles. The passenger camera device may be any video-recording device used to capture video of the environment when the passenger vehicle is self-driving. A LIDAR digital map is stored on the automated driving system. The LIDAR digital map includes road data which aids the passenger vehicle in making difficult turns and maneuvering around environmental obstacles. The LIDAR digital map includes a plurality of LIDAR profiles and a plurality of geospatial points. The plurality of LIDAR profiles is a set of environmental road data that aids in identifying sharp turns and environmental obstacles. The plurality of geo spatial points is a set of geographical coordinates that define where there are difficult turns and environmental obstacles. Each LIDAR profile is associated to a corresponding point from the plurality of geospatial points.

Figure 1:
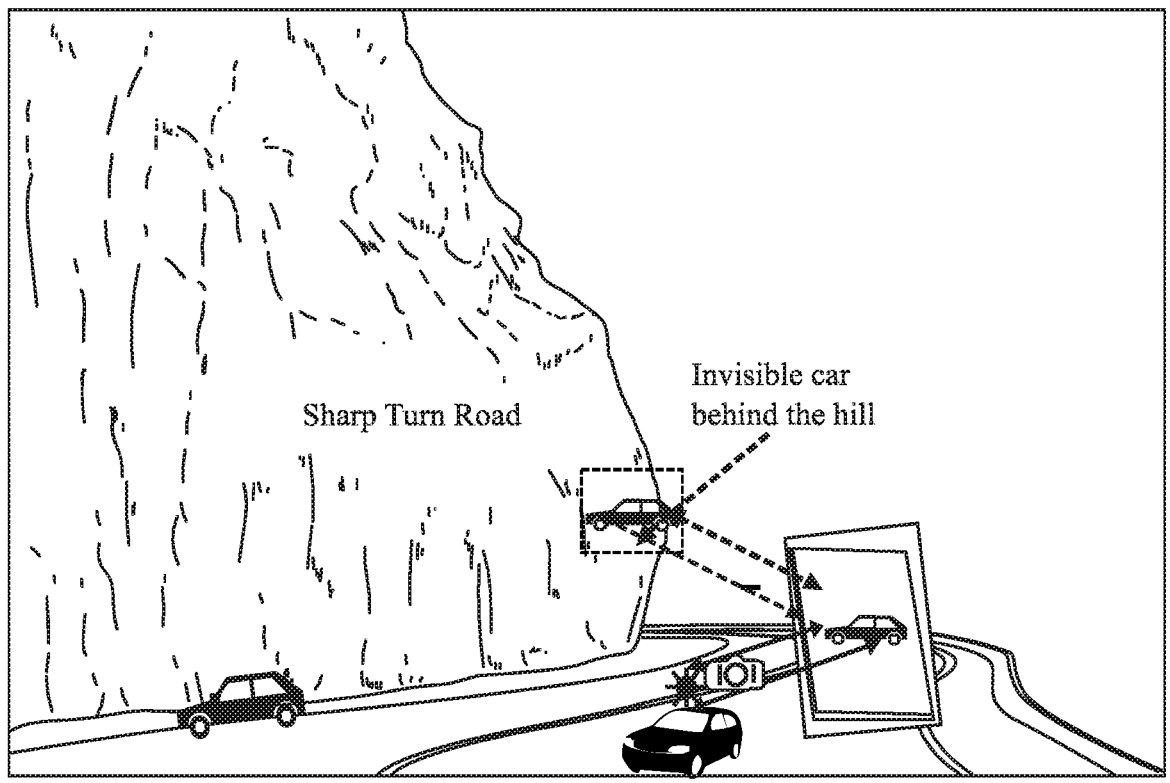
FIG. 1 is a schematic diagram illustrating a sharp turn.
Figure 2:
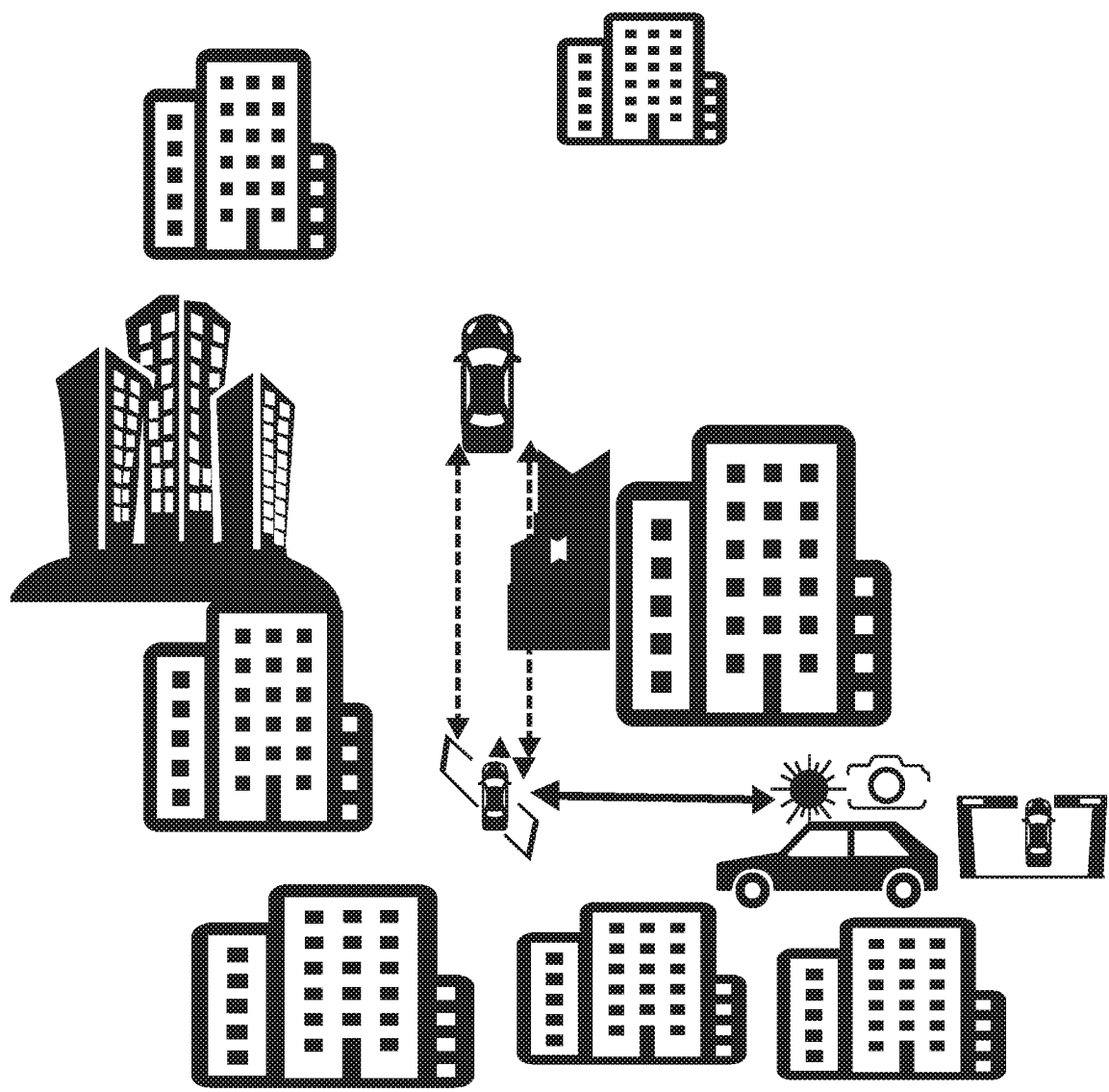
FIG. 2 is a schematic diagram illustrating LIDAR detection and ranging usage in a city.
Figure 3:
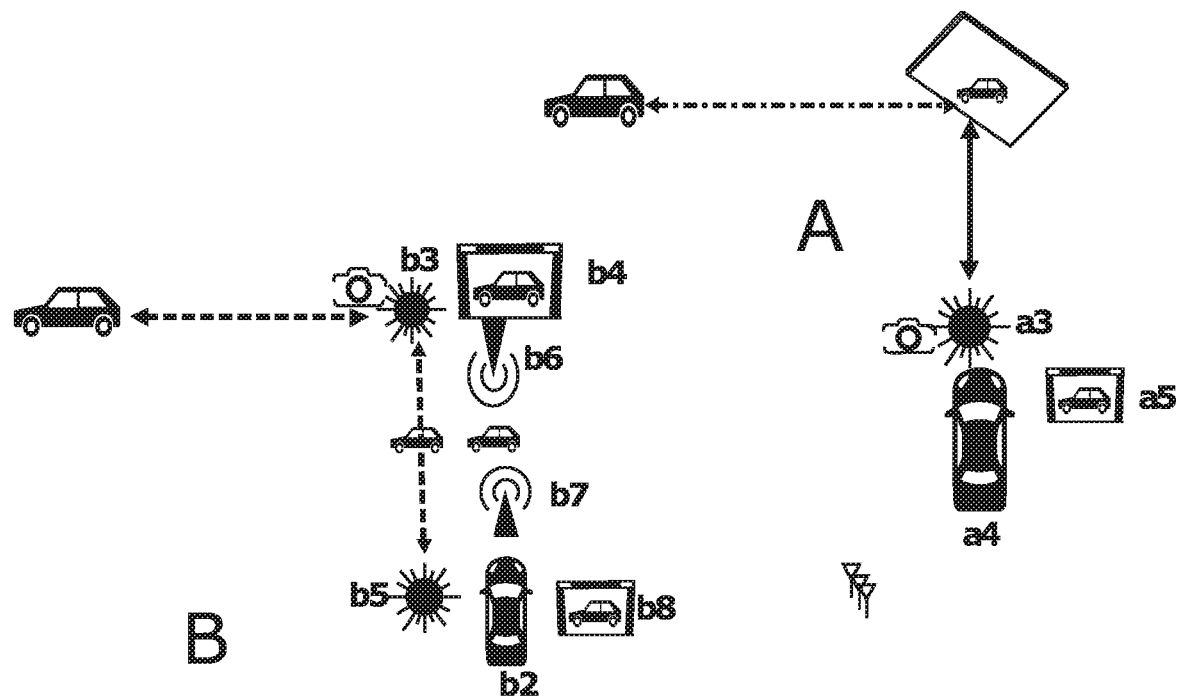
FIG. 3 is a schematic diagram illustrating two methods that improve automatic driving.
Figure 10:
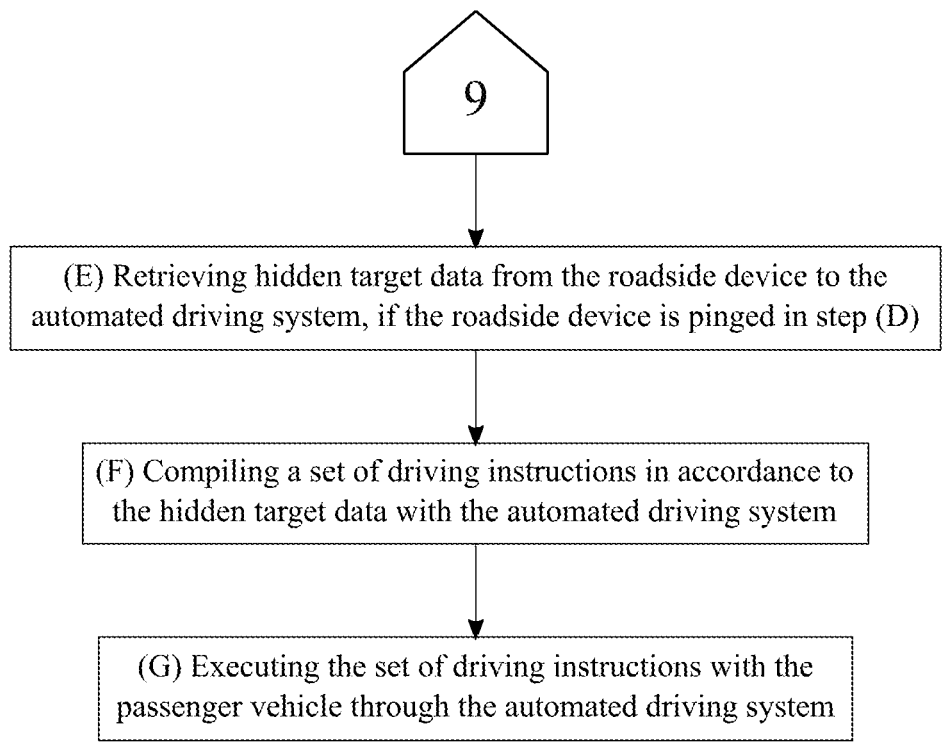
FIG. 10 is a continuation of FIG. 9.

In reference to FIGS. 9 and 10, the method of the present invention follows an overall process in order to improve automatic driving. The passenger LIDAR system and the passenger camera device continuously capture road-condition data (Step B). The road-condition data is live data of the roads that are being traversed by the passenger vehicle. The automated driving system compares the road-condition data to each LIDAR profile in order to identify a matching profile from the plurality of LIDAR profiles (Step C). The matching profile is a set of environmental road data that matches an upcoming sharp turn and/or an upcoming environmental obstacle included in particular road data of a LIDAR profile from the plurality of LIDAR profiles. The automated driving system pings the roadside device, if at least one non-line-of-sight condition is detected in the road-condition data and/or the corresponding point of the matching profile (Step D). With reference to FIG. 1, the non-line-of-sight condition is when the passenger vehicle does not have clear view of what proceeds a sharp turn and/or an environmental obstacle. The automated driving system retrieves hidden target data from the roadside device, if the roadside device is pinged in Step D (Step E). Hidden target data is data captured by the roadside device that reveals what proceeds a sharp turn and/or an environmental obstacle. The automated driving system compiles a set of driving instructions in accordance to the hidden target data (Step F). The set of driving instructions is an optimal set of instructions on how the passenger vehicle should drive during the sharp turn or when passing an environmental obstacle. The passenger vehicle executes the set of driving instructions through the automated driving system (Step G). Thus, automatic driving is improved by the passenger vehicle being able to safely make a sharp turn or pass an environmental obstacle.

Figure 11:
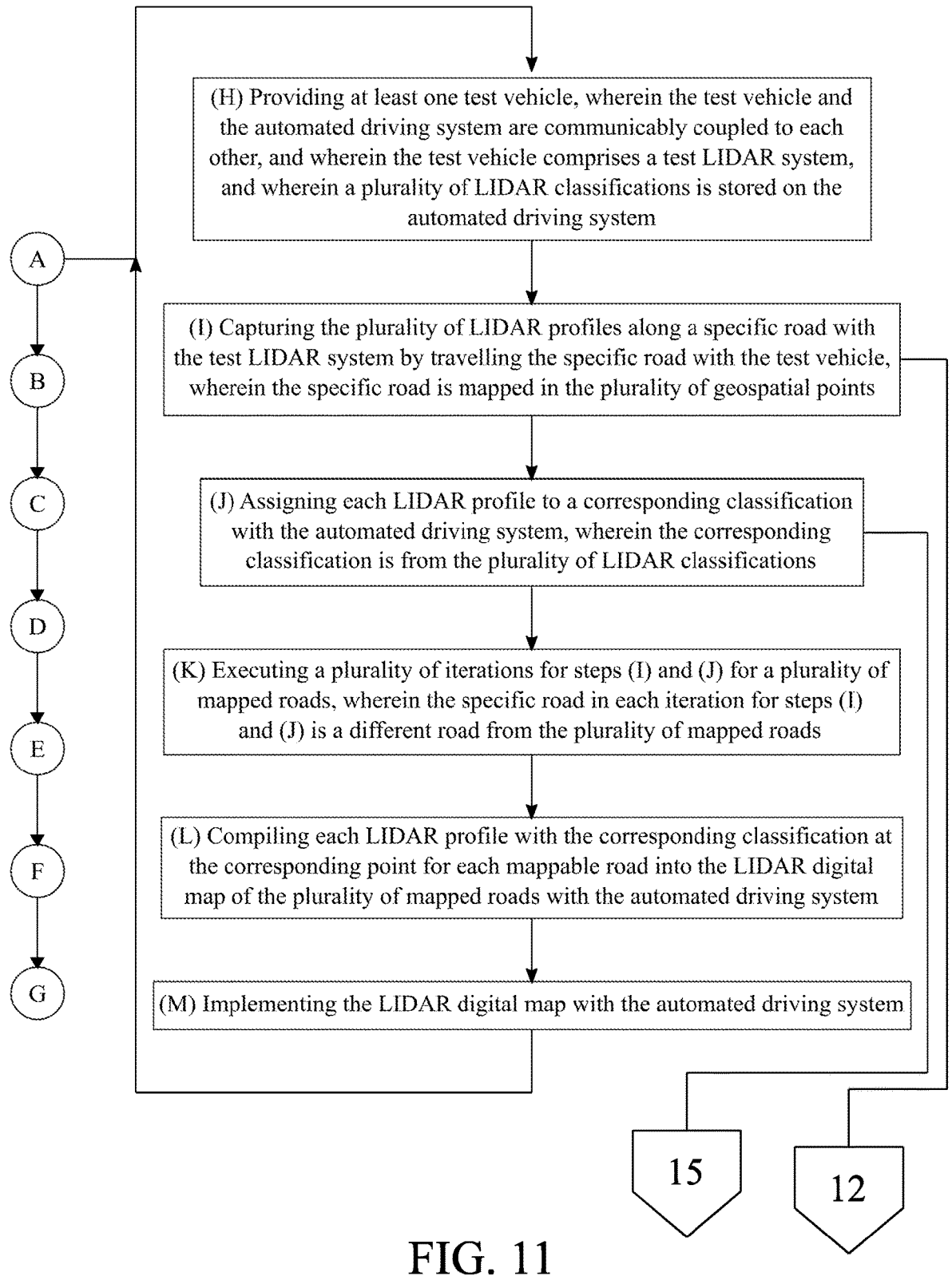
FIG. 11 is a flowchart illustrating the subprocess of making the LIDAR digital map.

With reference to FIG. 11, the following subprocess generates the LIDAR digital map in order to be used by the automated driving system. At least one test vehicle is provided (Step H). The test vehicle is a vehicle that is driven in order to capture that will make up the LIDAR digital map. The test vehicle and the automated driving system are communicably coupled to each other in order for the test vehicle to be self-driven. The test vehicle comprises a test LIDAR system and a plurality of LIDAR classifications is stored on the automated driving system. The test LIDAR system works exactly like the passenger LIDAR system although the test LIDAR system is mainly used to gather laser data for the LIDAR digital map. Each LIDAR classification is a type of LIDAR profile that represents one or more specific geographic features such as, but not limited to, terrain, road quality, road curvature, and the environmental obstacles along or near a road. The test vehicle captures the plurality of LIDAR profiles along a specific road by travelling the specific road with the test vehicle (Step I). The plurality of LIDAR profiles is a set of data regarding the topology and distribution of various points along a road. The specific road is a single path connecting two points on a map capable of supporting a vehicle and communicating various road laws. The specified road is mapped in a plurality of geospatial points, which is a set of global or relative coordinates capable of denoting the precise location of a point or defined section of a road. Each LIDAR profile is associated to a corresponding point from the plurality of geospatial points, which allows each LIDAR profile to be mapped along the specific road by their geospatial location. Each LIDAR profile is next assigned to a corresponding classification with the automated driving system (Step J), wherein the corresponding classification is from the plurality of LIDAR classifications. This provides each LIDAR profile with relevant supplemental information about the documented area, thus enabling application of the captured data to a digital map. A plurality of iterations for Steps I and J is executed for a plurality of mapped roads, wherein the specific road in each iteration for Steps I and J is a different road from the plurality of mapped roads (Step K). In this way, a comprehensive set of mapping data can be generated for all of the roads within a designated geographic area. Each LIDAR profile is compiled with the corresponding classification at the corresponding point for each mappable road into the LIDAR digital map of the plurality of mapped roads with the automated driving system (Step L). Thus, a fully comprehensive digital map, including the new data regarding the road, is generated. Finally, the LIDAR digital map is implemented with the automated driving system (Step M). In this way, relevant, up-to-date information is provided to any automated driving service. In an alternative embodiment, such information is further provided directly to the vehicle operator.

Figure 12:
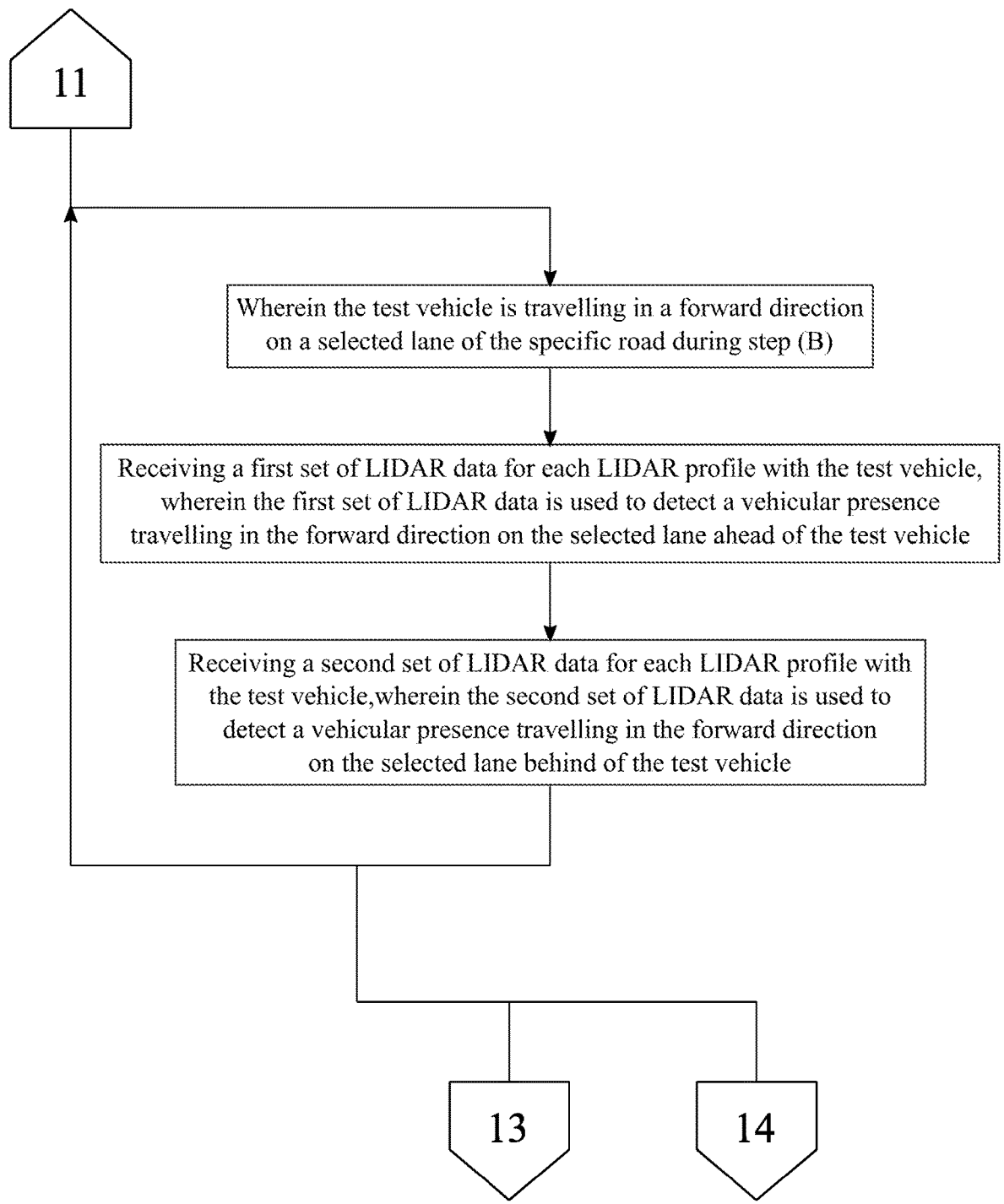
FIG. 12 is a flowchart illustrating the subprocess of detecting other vehicles in the same lane.
Figure 13:
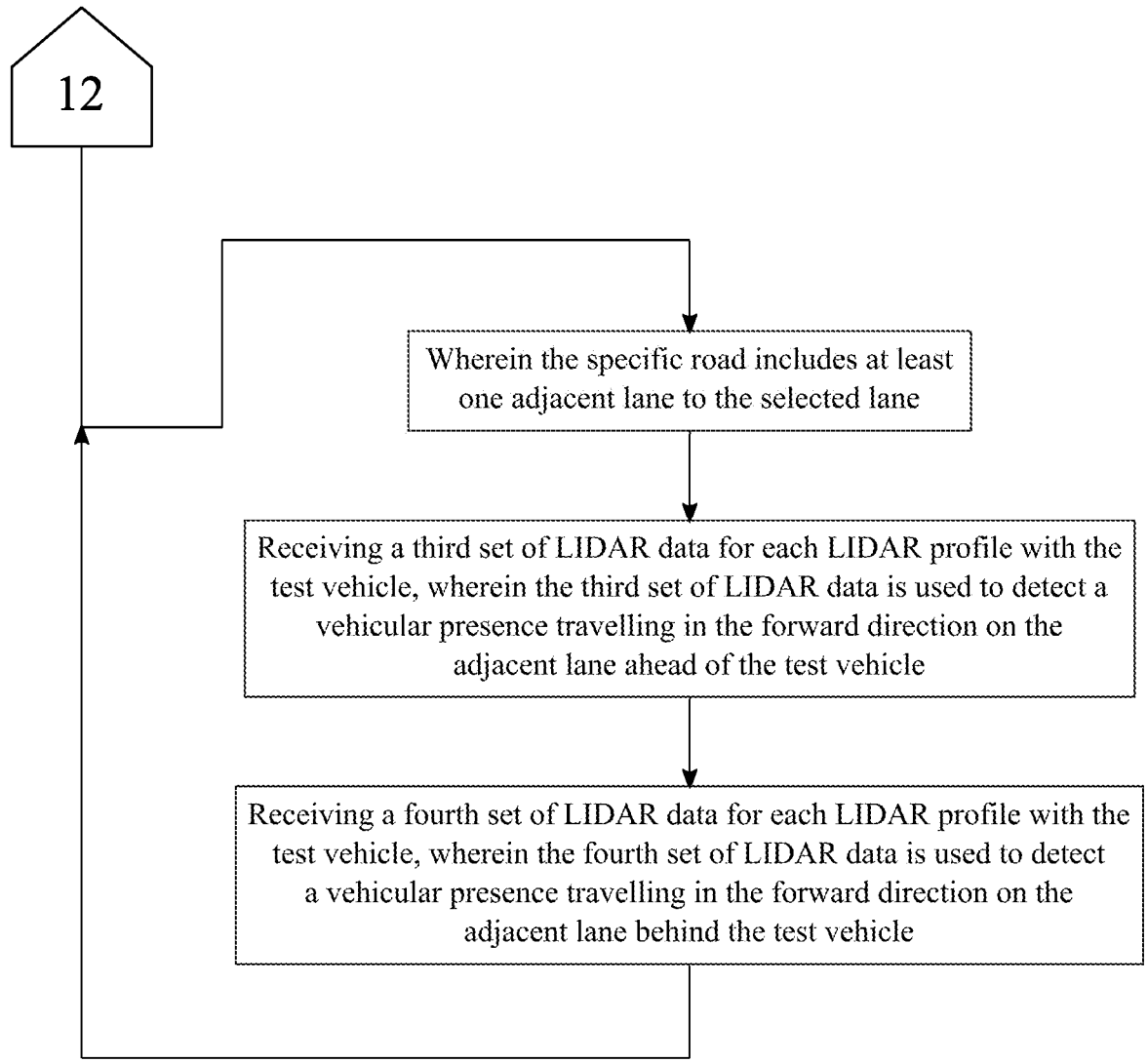
FIG. 13 is a flowchart illustrating the subprocess of detecting other vehicles in a different lane moving in the same direction.
Figure 14:
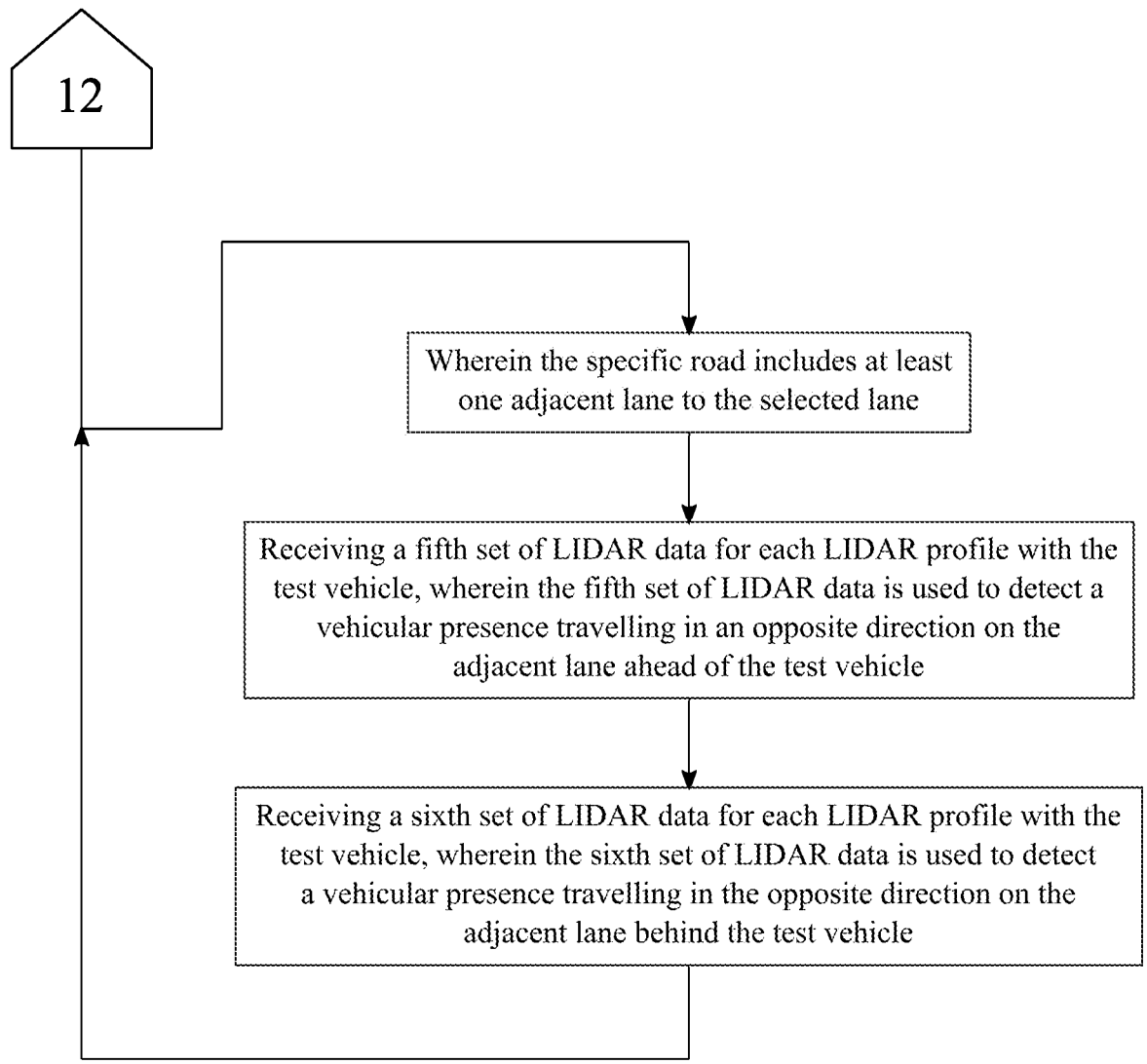
FIG. 14 is a flowchart illustrating the subprocess of detecting other vehicles in a different lane moving in the opposite direction.
Figure 15:
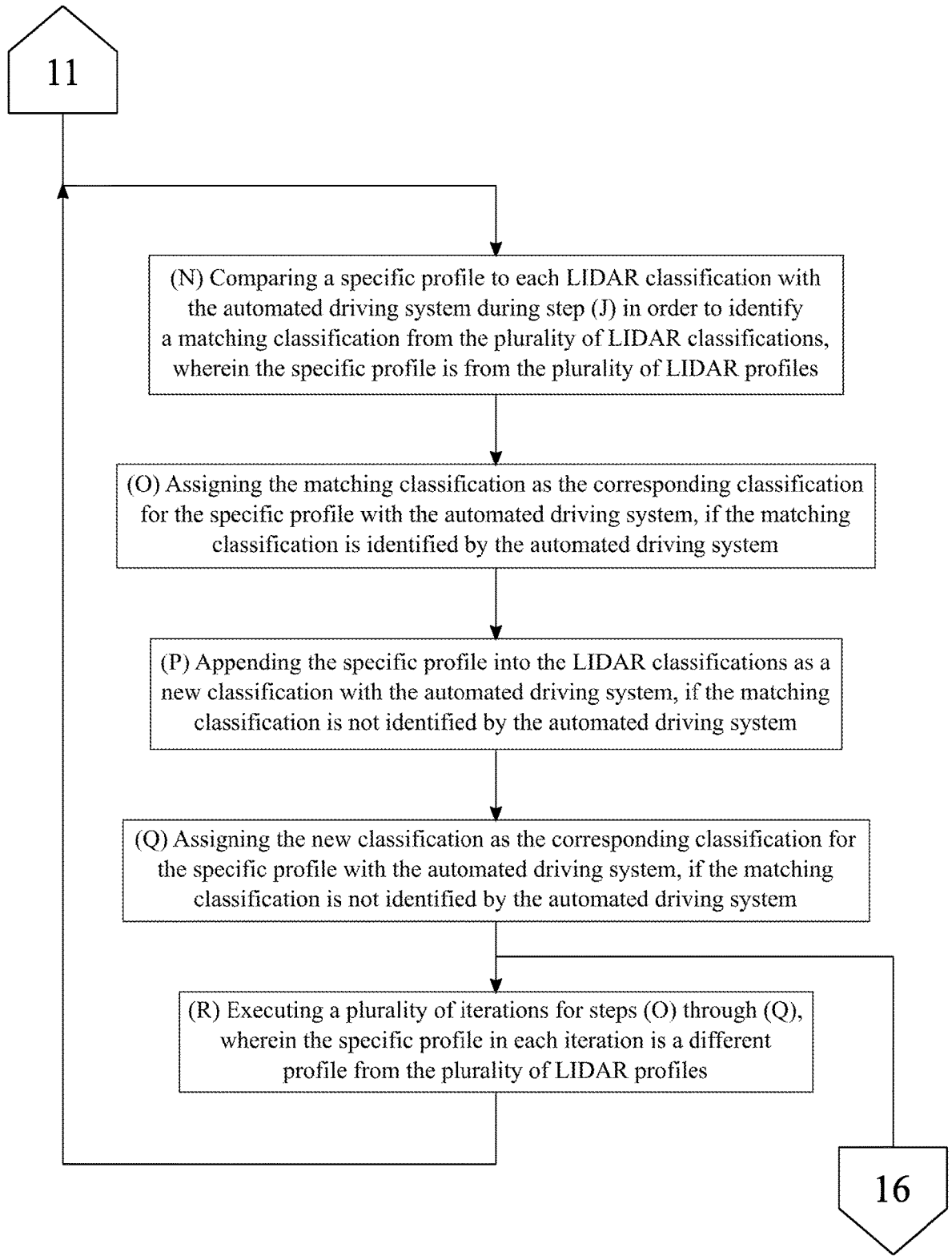
FIG. 15 is a flowchart illustrating the subprocess of geographically classifying LIDAR profiles.
Figure 16:
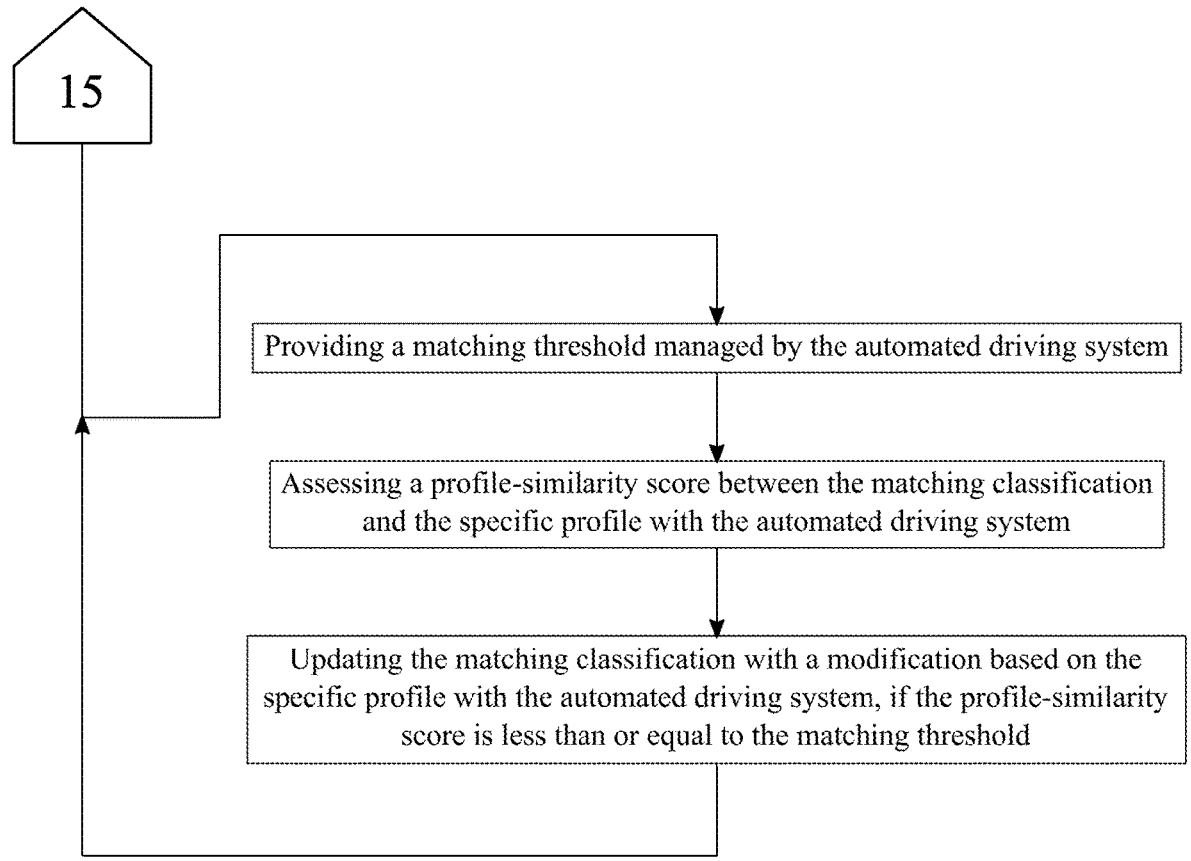
FIG. 16 is a flowchart illustrating the subprocess of updating a LIDAR classification.
Figure 17:
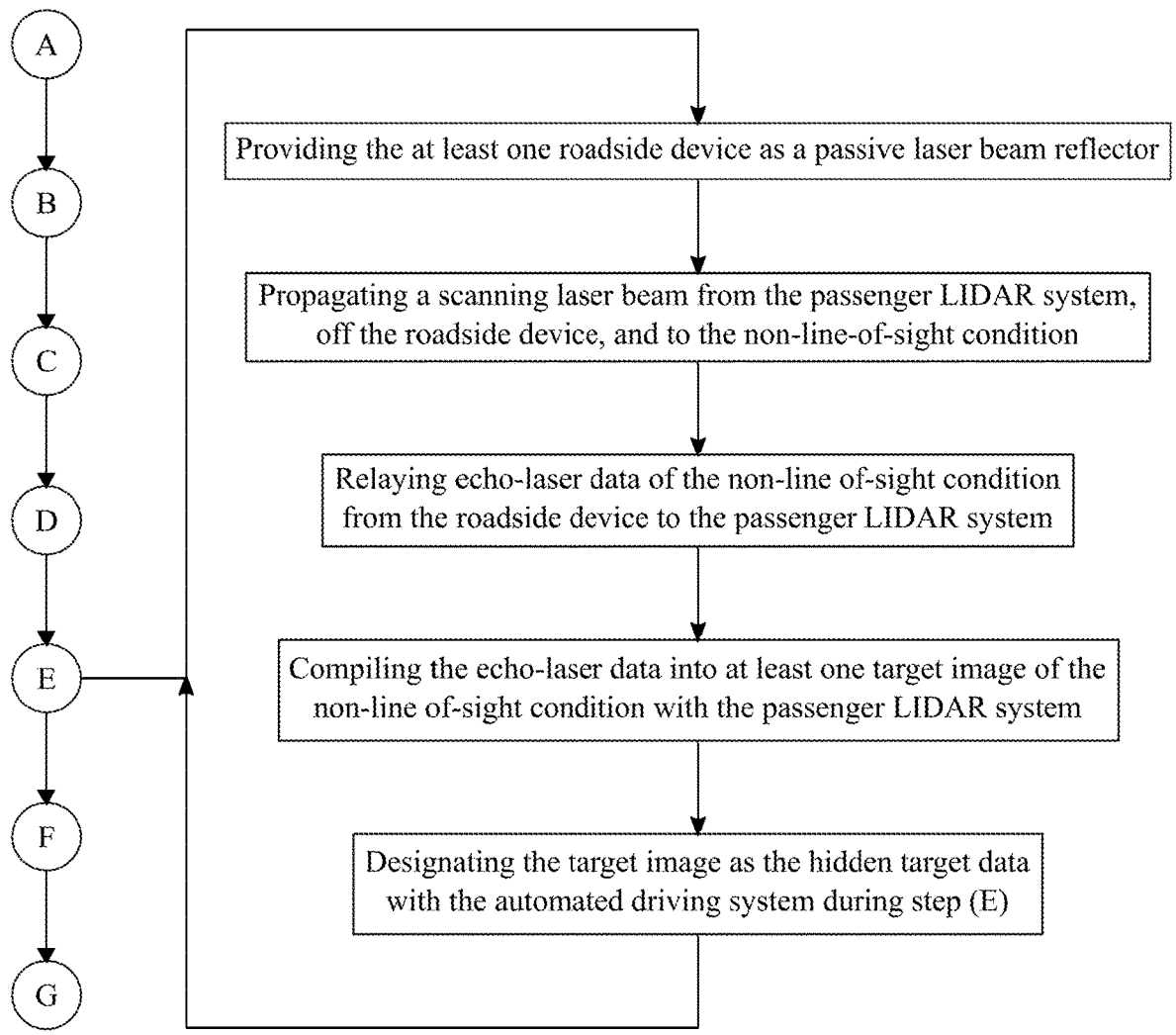
FIG. 17 is a flowchart illustrating the subprocess of generating the hidden target data using a passive laser beam reflector.
Figure 18:
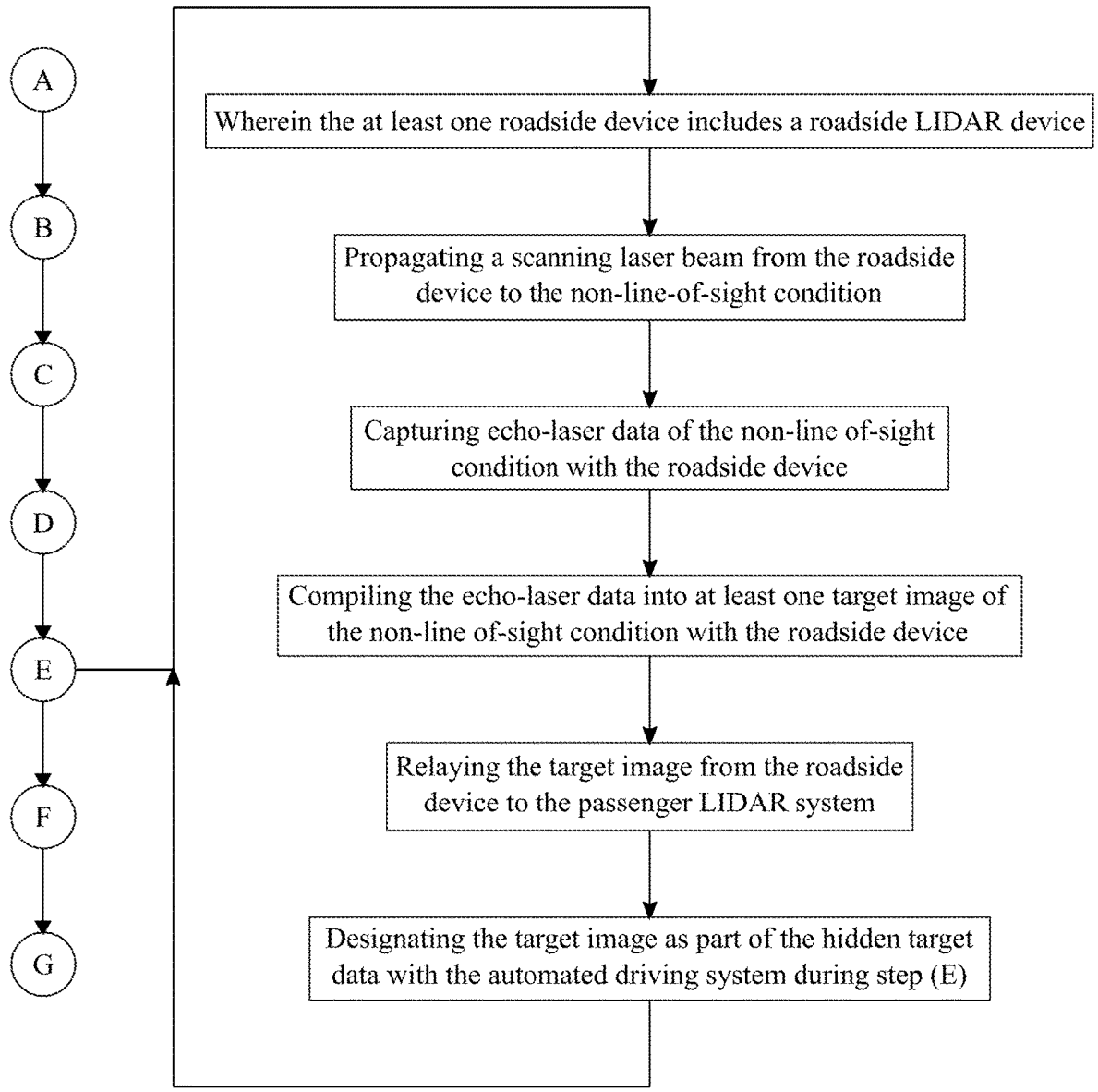
FIG. 18 is a flowchart illustrating the subprocess of generating part of the hidden target data using a roadside LIDAR device.
Figure 19:
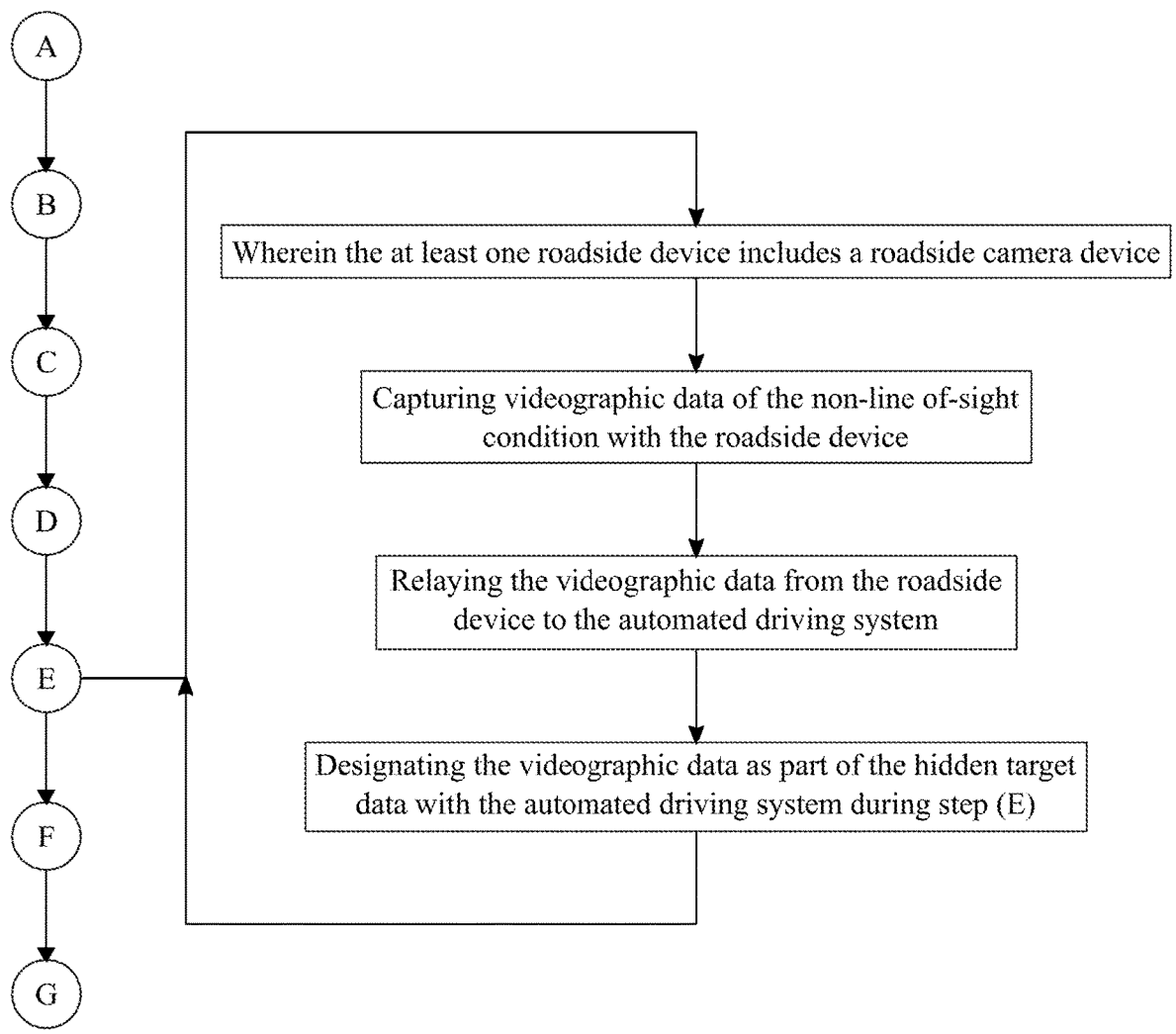
FIG. 19 is a flowchart illustrating the subprocess of generating part of the hidden target data using a roadside camera device.

With reference to FIG. 12, the test vehicle may be traveling on a road in proximity to other vehicles. To account for one such arrangement of vehicles, the test vehicle is travelling in a forward direction on a selected lane of the specific road during Step I. The test vehicle may be traveling upon any defined lane of the road of interest. A first set of LIDAR data for each LIDAR profile is received with the test vehicle, wherein the first set of LIDAR data is used to detect a vehicular presence travelling in the forward direction on the selected lane ahead of the test vehicle. Thus, the test vehicle is provided with the location of one or several vehicles ahead of the test vehicle so that the automated driving system can eventually distinguish between those vehicles and static objects near the specific road. A second set of LIDAR data is received for each LIDAR profile with the test vehicle, wherein the second set of LIDAR data is used to detect a vehicular presence travelling in the forward direction on the selected lane behind of the test vehicle. Thus, the test vehicle is provided with the location of one or several vehicles behind the test vehicle, so that the automated driving system can again eventually distinguish between those vehicles and static objects near the specific road. Such positional data is crucial to improving the effectiveness of automated driving systems.

In many scenarios, a road must be wide enough to accommodate heavier traffic flow. To adjust for this possibility and with reference to FIG. 13, the specific road includes at least one adjacent lane to the selected lane. The specific road may, in this case, be a multi-lane highway, a busy urban intersection, or a variety of other common road configurations. A third set of LIDAR data for each LIDAR profile is received with the LIDAR vehicle, wherein the third set of LIDAR data is used to detect a vehicular presence travelling in the forward direction on the adjacent lane ahead of the test vehicle. Thus, the test vehicle is equipped to monitor vehicles that are diagonally ahead, so that the automated driving system can again eventually distinguish between those vehicles and static objects near the specific road. A fourth set of LIDAR data for each LIDAR profile is received with the test vehicle, wherein the fourth set of LIDAR data is used to detect a vehicular presence travelling in the forward direction on the adjacent lane behind the test vehicle. This arrangement enables the test vehicle to monitor vehicles that are diagonally behind so that the automated driving system can again eventually distinguish between those vehicles and static objects near the specific road.

It is further likely that the test vehicle is traveling on a road with traffic in the opposite direction in the immediately adjacent lane. To allow the test vehicle to respond to such a scenario and with reference to FIG. 14, the specific road includes at least one adjacent lane to the selected lane. The at least one adjacent lane may be to the left or to the right of the driver depending upon the laws of the country. A fifth set of LIDAR data for each LIDAR profile is received with the test vehicle, wherein the fifth set of LIDAR data is used to detect a vehicular presence travelling in an opposite direction on the adjacent lane ahead of the test vehicle. Thus, the test vehicle is equipped to monitor to cars that are diagonally ahead so that the automated driving system can again eventually distinguish between those vehicles and static objects near the specific road. A sixth set of LIDAR data for each LIDAR profile is received with the test vehicle, wherein the sixth set of LIDAR data is used to detect a vehicular presence travelling in the opposite direction on the adjacent lane behind of the test vehicle. Thus, the test vehicle is equipped to monitor to cars that are diagonally behind so that the automated driving system can again eventually distinguish between those vehicles and static objects near the specific road.

The geographic classification system described briefly in Step J may work in conjunction with an LIDAR profile to determine topology and road conditions. To this end and with reference to FIG. 15, a specific profile is compared to each LIDAR classification with the automated driving system in order to identify a matching classification from the plurality of LIDAR classifications, wherein the specific profile is from the plurality of LIDAR profiles (Step N). Comparing the specific profile to each LIDAR classification allows for the determination of differences for subsequent analysis. The matching classification is assigned as the corresponding classification for the specific profile with the automated driving system, if the matching classification is identified by the automated driving system (Step O). Thus, the corresponding classification may be subsequently utilized in the determination of relevant road features. Alternatively, the specific profile is appended into the LIDAR classifications as a new classification with the automated driving system, if the matching classification is not identified by the automated driving system (Step P). This arrangement enables the addition of new types of objects and features of the road into the automated driving system. The new classification is assigned as the corresponding classification for the specific profile with the automated driving system, if the matching classification is not identified by the automated driving system (Step Q). In this way, unexpected objects are noted and processed in relation to the digital map. Finally, a plurality of iterations is executed for Steps O through Q, wherein the specific profile in each iteration is a different profile from the plurality of LIDAR profiles (Step R). Thus, all of the LIDAR profiles are geographically classified along the specific road.

The system requires a mechanism by which to compare and recognize road features. To this end and with reference to FIG. 16, a matching threshold managed by the automated driving system is provided. The matching threshold is the minimum amount of similarities that need to be shared between an LIDAR profile and a LIDAR classification in order for the LIDAR classification to be designated as a matching classification for the LIDAR profile. A profile-similarity score between the matching classification and the specific profile is assessed with the automated driving system. In this way, the automated driving system generates a value related to the similarity of the matching classification to the specific profile. The matching classification is next updated with a modification based on the specific profile with the automated driving system, if the profile-similarity score is less than or equal to the matching threshold. In this way, automated driving system is able to refine and update each LIDAR classification.

The following subprocess generates the hidden target data that is retrieved by the automated driving system. In a first embodiment of the present invention and with reference to FIG. 17, the at least one roadside device is preferably a passive laser beam reflector. The passive laser beam reflector is a passive device that is used to reflect laser beams emitted by a LIDAR device. The passenger LIDAR system propagates a scanning laser beam off the roadside device to the non-line-of-sight condition. The scanning laser beam is light in the form of a pulse laser that is generated by the passenger LIDAR system. The echo-laser data of the non-light-of-sight condition is relayed from the roadside device to the passenger LIDAR system. The echo-laser data of the non-light-of-sight condition is data that is captured by the scanning laser beam that reveals what proceeds a sharp turn or environmental obstacle. The passenger LIDAR system compiles the echo-laser data into at least one target image of the non-light-of-sight condition. The target image is a 3-D representation of what proceeds a sharp turn or environmental obstacle. The automated driving system designates the target image as hidden target data during Step E. Thus, the hidden target data can be retrieved by the automated driving system.

The following subprocess generates part of the hidden target data that is retrieved by the automated driving system. In a second embodiment of the present invention and with reference to FIG. 18, the at least one roadside device includes a roadside LIDAR device. The roadside LIDAR device is an active device that is used to retrieve the hidden target data. The roadside device propagates a scanning laser beam to the non-light-of-sight condition. The roadside device captures echo-laser data of the non-line-of-sight condition. The roadside device compiles the echo-laser data into at least one target image of the non-line-of-sight condition. The target image is relayed from the roadside device to the passenger LIDAR system. For this to occur, the roadside LIDAR device and the passenger LIDAR device must be in optical communication with each other. The automated driving system designates the target image as part of the hidden target data during Step E. Thus, the roadside device is able to generate hidden target data that can be retrieved by the automated driving system.

The following subprocess generates part of the hidden target data that is retrieved by the automated driving system. In a third embodiment and with reference to FIG. 19, the at least one roadside device includes a roadside camera device. The roadside camera device is an active device that is used to capture hidden target data. The roadside device captures videographic data of the non-line-of-sight condition. The videographic data is a visual representation of what proceeds a sharp turn or environmental obstacle. The videographic data is relayed from the roadside device to the automated driving system. For this to occur, the roadside device and the automated driving system must be in wireless communication with each other. The automated driving system designates the videographic data as part of the hidden target data during Step E. Thus, the roadside device is able to capture hidden target data can be retrieved by the automated driving system.

In a fourth embodiment of the present invention, the roadside device includes both the roadside LIDAR device and the roadside camera device. Thus, the roadside LIDAR device can generate part of the hidden target data and the roadside camera device can capture part of the hidden target data. This embodiment provides two forms of hidden target data that can be retrieved by the automated driving system. Therefore, the safety of the passenger vehicle improves when driving through a sharp turn or passing by an environmental obstacle.

Supplemental Description

Figure 4:
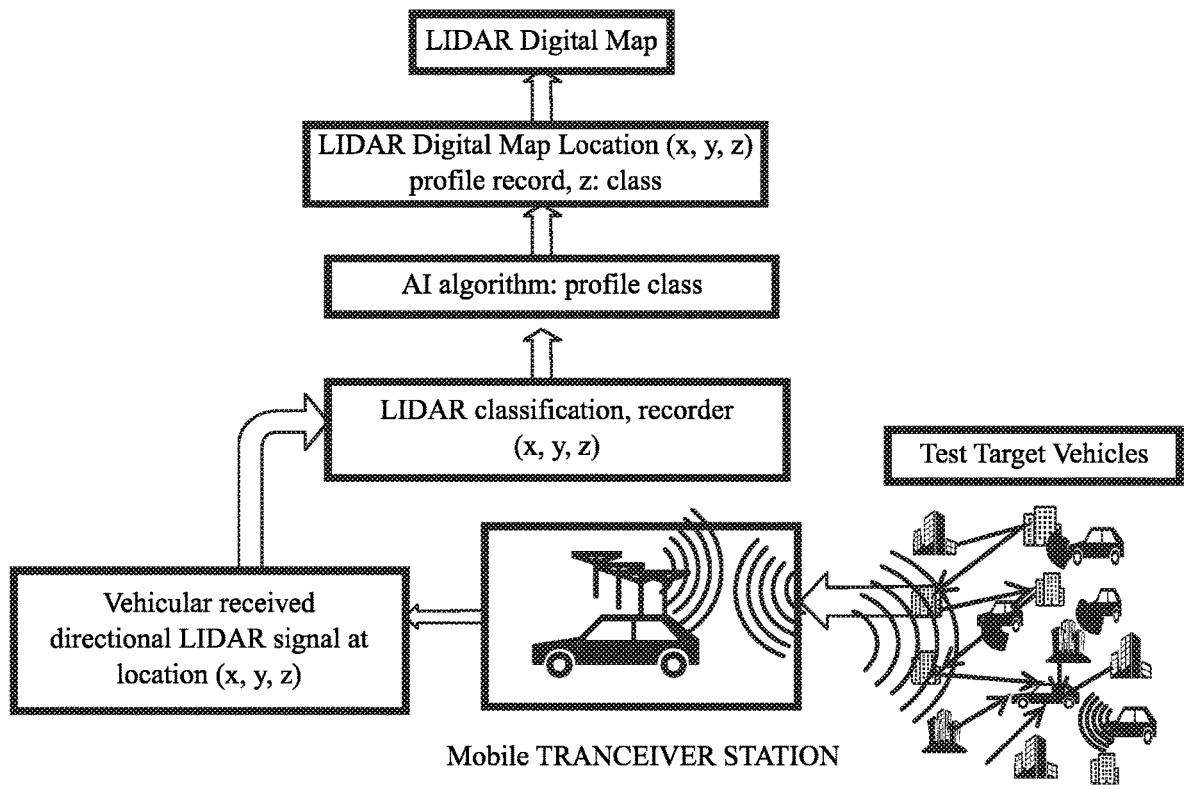
FIG. 4 is a schematic diagram illustrating the process of capturing each LIDAR profile.
Figure 5:
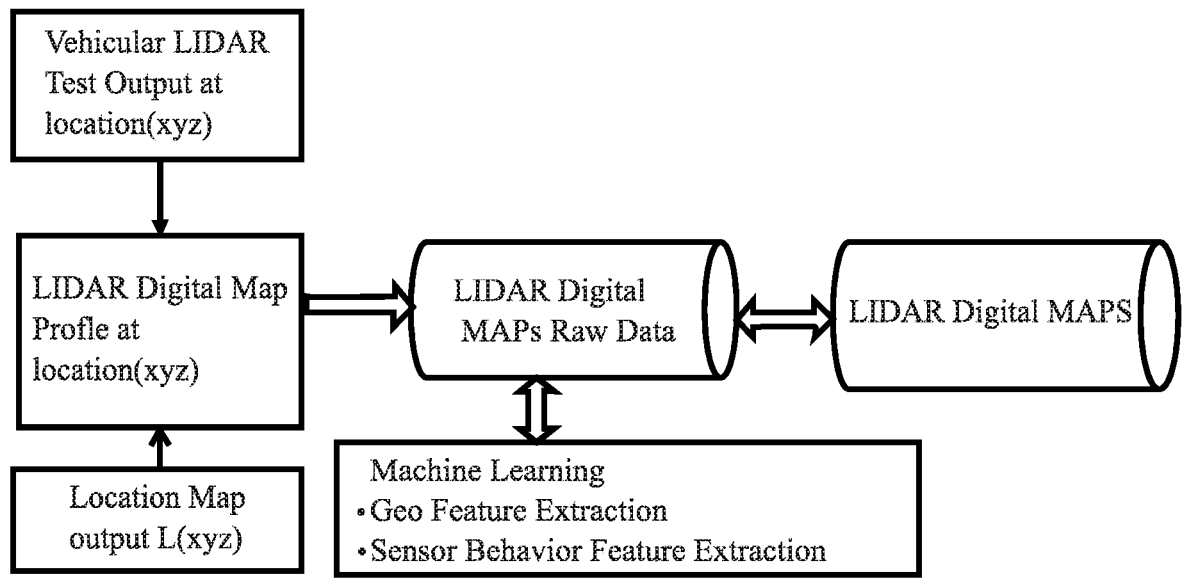
FIG. 5 is a schematic diagram illustrating the process of making the LIDAR digital map.
Figure 6:
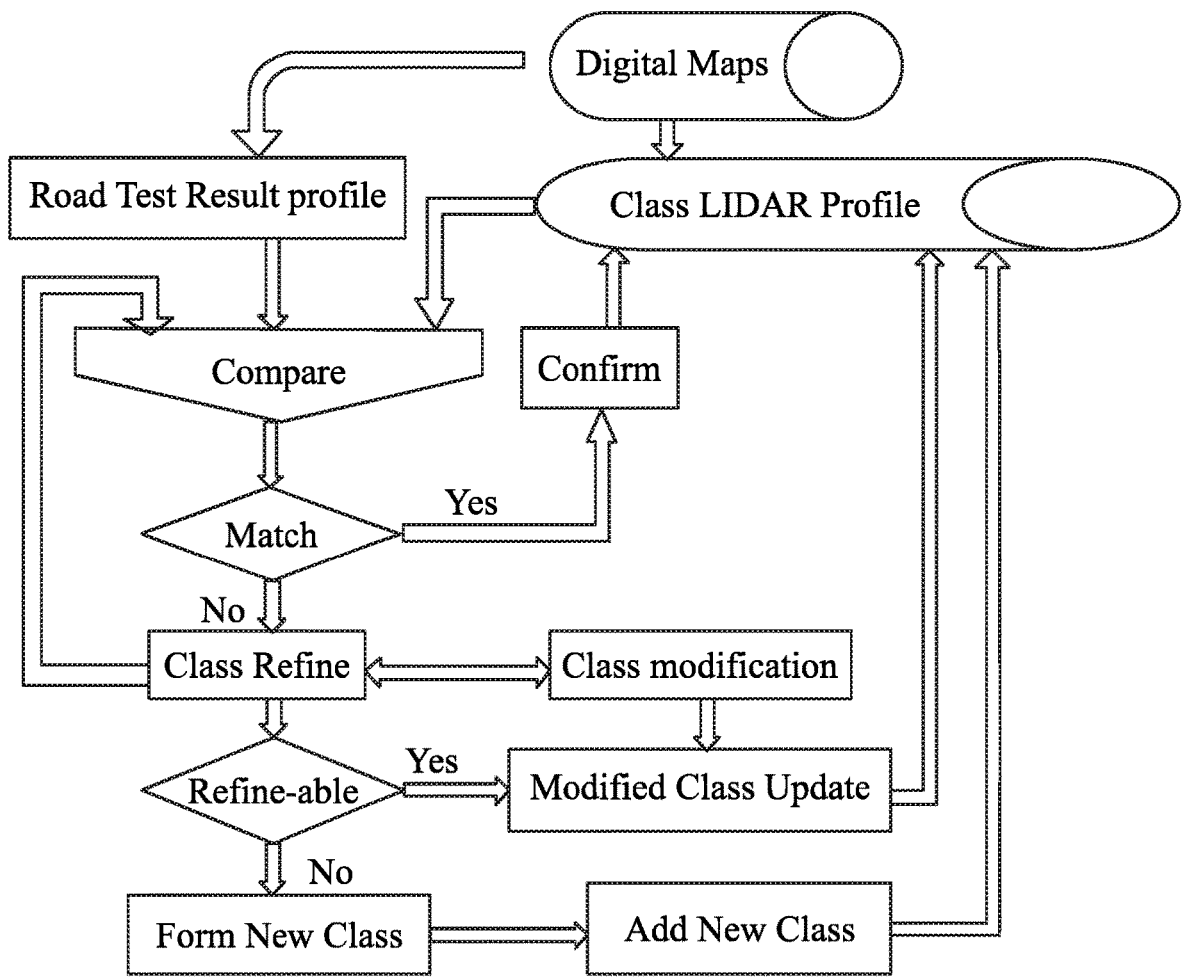
FIG. 6 is a schematic diagram illustrating the process of assigning a profile class.

Methodology and procedure of forming digital sensor map include:

a. The first step of invented LIDAR digital map formation is road test of LIDAR and digital camera. The test uses multi vehicles in different location with different direction and speeds, as illustrated in FIG. 4, as an example.

b. The collected data will be used to construct a data base. A machine learning approach enables to build LIDAR laser beam propagation profile for typical geographic and traffic conditions, as shown in FIG. 4.

c. Machine learning algorithms are used to construct LIDAR laser beam propagation classes that are associate with a particular geographic features and Laser beam propagate features. Those features are extracted by AI classification algorithm from digital map and data base built by LIDAR sensor road test as in (b).

d. Road geophysical feature extraction is accomplished by AI machine learning to build a group of geographical features, such as road curvature, surrounding 3D features that are relevant and important to LIDAR line-of-sight propagation requirement.

e. The LIDAR digital map classification is built from features yield in (d) and by interactively verification by road test as illustrated by the flow diagram in FIG. 5, and by verify and calibrate the class profile for the location (x,y), as shown in FIG. 6. By define and constructing class, the LIDAR digital map is able to deduct the LIDAR propagation profile via classification of geographic features, such as road curvature and road surrounding 3D features without to do road test. Therefore, the LIDAR digital map would cover any road location.

f. Road test results for each geographic class is used to predict an LIDAR profile class for each Geographical feature. It will be iteratively verified by real test data, modify the class profile, or created new class if the test results cannot fit into any built class. This is an iterative process to refine class definition, add new class by comparing test data and existing classes as shown by the flow diagram in FIG. 7.

g. Once enough road test has been done, and the data base has been established, the Digital Sensor Map can be constructed (deducted) from digital map and digital sensor class analytically.

h. This machine learning based feature classification simplifies the LIDAR digital map construction and field test procedure, but still able to cover all geographic road condition to build LIDAR characteristics profile. The Digital Sensor Map of LIDAR and digital camera makes auto LIDAR/Camera detection for all road conditions possible. The LIDAR digital map provide a great tool LIDAR system reliability and target detectability.

i. Road geophysical feature extraction is accomplished by AI machine learning to build a group of geographical features that are relevant and important to LIDAR propagation. The LIDAR propagation profile will be used in receiving and transmission by knowledge of non-line-of-sight and other LIDAR wave propagation features at a particular location on the LIDAR digital maps.

The digital sensor map test is defined as following:

LIDAR map profile is built for a road point that is descript in a digital map as (X,Y), for each point in digital map a LIDAR profile is built denote as $\mathcal{R}$ (x,y).

For a road location (x,y), the profile set $\mathcal{R}$ (x,y) contents:
a. the receiving echo images of LIDAR laser beam scan, ahead of LIDAR distance ranger (1, 500) meter.
b. Laser beam reflect characters from cars in the same direction, behind of radar distance ranger (1, 500) meter.
c. LIDAR received image characters from cars in the same direction, but in adjacent lane (s) ahead of radar distance ranger (1, 500) meter.
d. LIDAR received image characters from cars in the opposite direction, but in adjacent lane (s) ahead of radar distance ranger (1, 500) meters.
e. LIDAR received image characters from cars in the opposite direction, but in adjacent lane (s) behind of radar distance ranger (1, 500) meters.
f. The test scenario in covers many variables, such as number of surrounding cars in all lanes and all possible car number N∈{0, N} in M∈{1, M}.
g. Non-line-of-sight of laser beam scan character is marked on the LIDAR digital map.
h. The LIDAR propagation profile will be used to determine if the location is marked as LIDAR alarm point and activate roadside passive remedy or active LIDAR rely device.

Remedies non-line-of-sight for vehicle LIDAR and camera include:

For laser beam of LIDAR and digital camera, line-of-sight condition is a necessary working condition. There are many road geophysical locations where the line-of-sight condition cannot meet. In those road locations the LIDAR system would fail to perform, therefore the automatic driving would fail. This present a great challenge for developing LIDAR and digital camera sensors automatic driving vehicular that work for all road geographic conditions.

In this invention are remedies to resolve LIDAR targets blind areas detection problem. The invented remedies are roadside installed devices.

1. Passive laser beam reflector that can reflect laser beam, illustrated on FIG. 3A:
   a. To relay LIDAR scanning laser beam to illuminate targets in the hiding road point, i.e. LIDAR blind points that are in non-ling-on-sight road locations.
   b. Reflected echo of LIDAR scanning laser beam from targets back to LIDAR device installed on vehicle.
   c. LIDAR can form the images from the roadside installed reflector
   d. The reflector can be mirror or device made of laser beam reflect materials
   e. Passive reflectors for digital camera, such as special purpose mirrors 2. Active devices, illustrated on FIG. 3B:
   a. Roadside installed LIDAR sensor and that focus on these blind area
   b. Roadside installed digital video camera that focus LIDAR blind area
   c. Roadside installed LIDAR and/or digital camera with wireless communication device to be able to detect targets and form targets imagen and send detected results to vehicle auto driving sensor control system and automatic driving control system.
   d. Roadside installed LIDAR with optical communication capability that send detection results, such as image, speed, to vehicle installed Lidar
   e. Roadside installed digital video camera with wireless transmit that transmit image back to vehicle automatic driving control unit, as illustrated on FIG. 3B.

Figure 7:
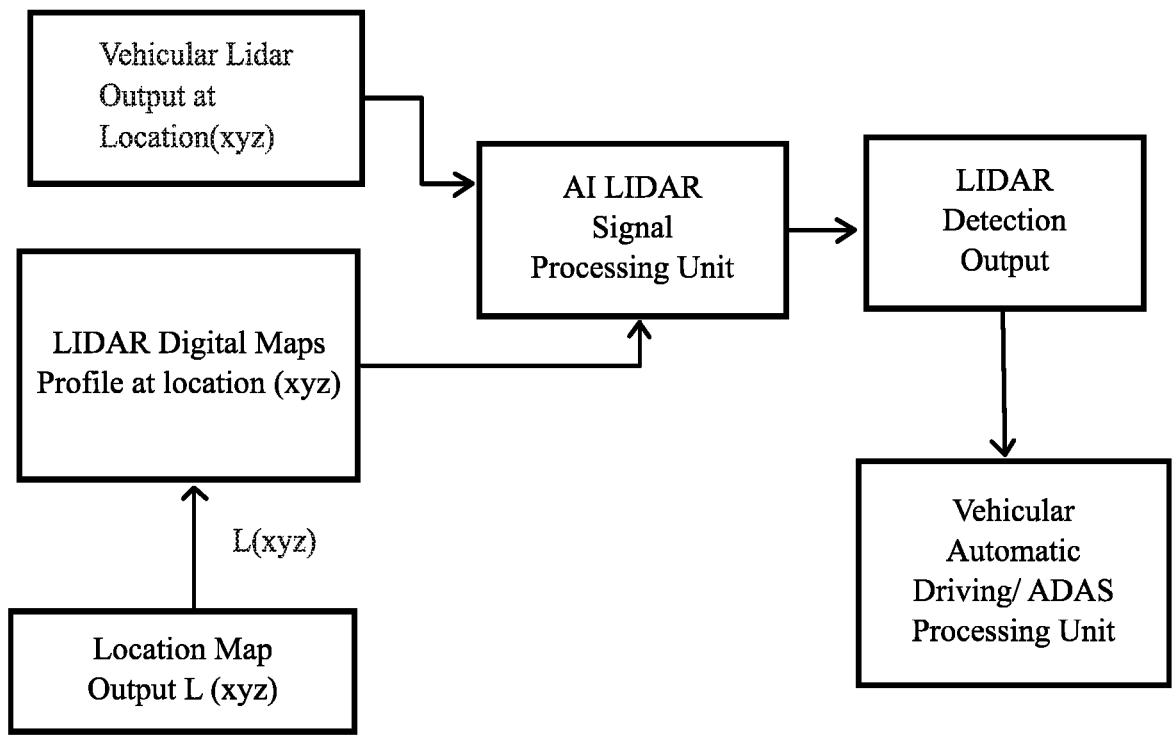
FIG. 7 is a schematic diagram illustrating the process of applying an artificial intelligence (AI) LIDAR signal to the present invention.
Figure 8:
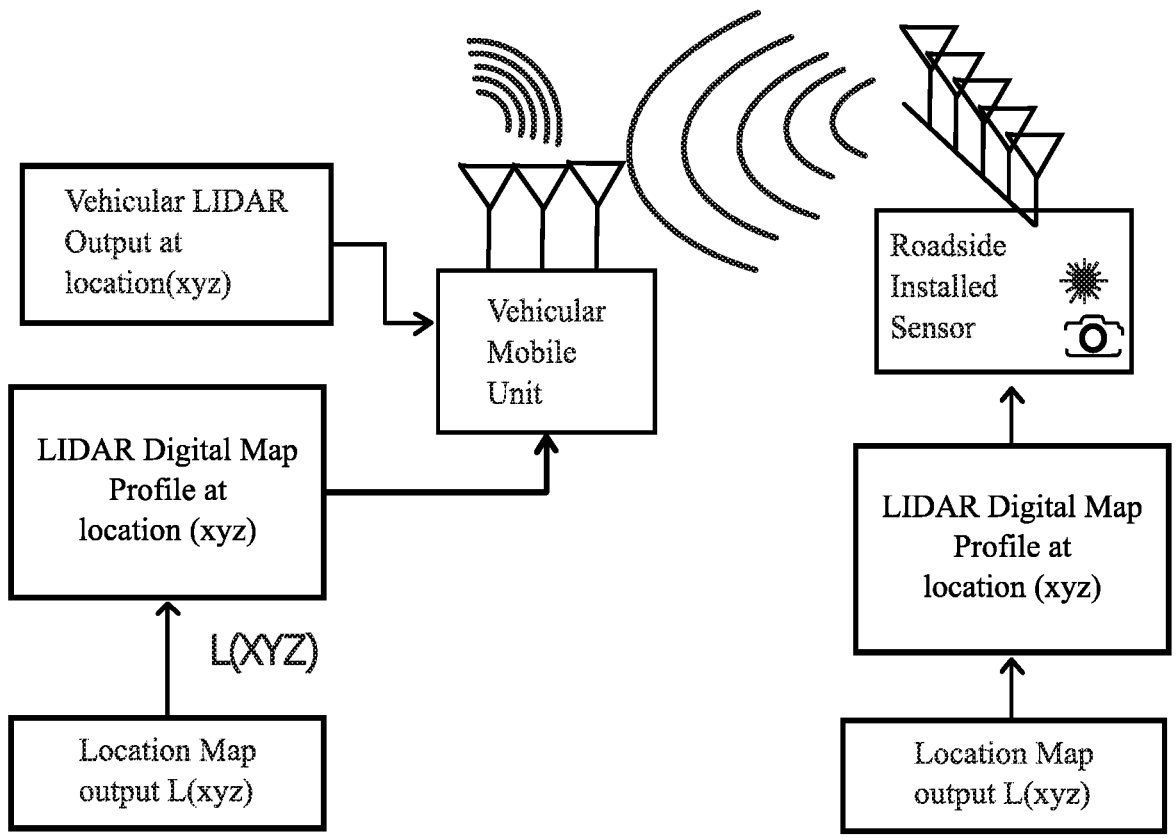
FIG. 8 is a schematic diagram illustrating the process of passenger vehicle-to-roadside device communication.

LIDAR digital map in ADAS and automatic driving vehicle include:

As shown in flow diagram in FIG. 7, the vehicle sensor control system will get indicator from LIDAR Digital Map on road location (x, y) to make decision to take detection outputs from vehicle installed LIDAR and/or digital camera:
   a. Vehicle installed Lidar and/or digital camera utilize the roadside device installed sensor devices
   b. From roadside device:
      i) Passive device
      ii) Active sensor device Although the invention has been explained in relation to its preferred embodiment, it is to be understood that many other possible modifications and variations can be made without departing from the spirit and scope of the invention as hereinafter claimed.

What is claimed is:

1. A method of utilizing a LIDAR digital map to improve automatic driving, the method comprises the steps of:
   (A) providing at least one passenger vehicle, an automated driving system, and at least one roadside device, wherein the passenger vehicle and the automated driving system are communicably coupled to each other, and wherein the passenger vehicle comprises a passenger LIDAR system and a passenger camera device, and wherein a LIDAR digital map is stored on the automated driving system, and wherein the LIDAR digital map includes a plurality of LIDAR profiles and a plurality of geospatial points, and wherein each LIDAR profile is associated to a corresponding point from the plurality of geospatial points;
   (B) continuously capturing road-condition data with the passenger LIDAR system and the passenger camera device;
   (C) comparing the road-condition data to each LIDAR profile with the automated driving system in order to identify a matching profile from the plurality of LIDAR profiles;
   (D) pinging the roadside device, after at least one non-line-of-sight condition is detected in the road-condition data and/or the corresponding point of the matching profile with the automated driving system;
   (E) retrieving hidden target data from the roadside device to the automated driving system, after the roadside device is pinged in step (D);

(F) compiling a set of driving instructions in accordance to the hidden target data with the automated driving system;

(G) executing the set of driving instructions with the passenger vehicle through the automated driving system;

(H) providing at least one test vehicle, wherein the test vehicle and the automated driving system are communicably coupled to each other, and wherein the test vehicle comprises a test LIDAR system, and wherein a plurality of LIDAR classifications is stored on the automated driving system;

(I) capturing the plurality of LIDAR profiles along a specific road with the test LIDAR system by travelling the specific road with the test vehicle, wherein the specific road is mapped in the plurality of geospatial points;

(J) assigning each LIDAR profile to a corresponding classification with the automated driving system, wherein the corresponding classification is from the plurality of LIDAR classifications;

(K) executing a plurality of iterations for steps (I) and (J) for a plurality of mapped roads, wherein the specific road in each iteration for steps (I) and (J) is a different road from the plurality of mapped roads;

(L) compiling each LIDAR profile with the corresponding classification at the corresponding point for each mappable road into the LIDAR digital map of the plurality of mapped roads with the automated driving system; and (M) implementing the LIDAR digital map with the automated driving system.

2. The method of utilizing a LIDAR digital map to improve automatic driving, the method as claimed in claim 1 comprises the steps of:
wherein the test vehicle is travelling in a forward direction on a selected lane of the specific road during step (I);
receiving a first set of LIDAR data for each LIDAR profile with the test vehicle, wherein the first set of LIDAR data is used to detect a vehicular presence travelling in the forward direction on the selected lane ahead of the test vehicle; and
receiving a second set of LIDAR data for each LIDAR profile with the test vehicle, wherein the second set of LIDAR data is used to detect a vehicular presence travelling in the forward direction on the selected lane behind the test vehicle.

3. The method of utilizing a LIDAR digital map to improve automatic driving, the method as claimed in claim 2 comprises the steps of:
wherein the specific road includes at least one adjacent lane to the selected lane;
receiving a third set of LIDAR data for each LIDAR profile with the test vehicle, wherein the third set of LIDAR data is used to detect a vehicular presence travelling in the forward direction on the adjacent lane ahead of the test vehicle; and
receiving a fourth set of LIDAR data for each LIDAR profile with the test vehicle, wherein the fourth set of LIDAR data is used to detect a vehicular presence travelling in the forward direction on the adjacent lane behind the test vehicle.

4. The method of utilizing a LIDAR digital map to improve automatic driving, the method as claimed in claim 2 comprises the steps of:
wherein the specific road includes at least one adjacent lane to the selected lane;
receiving a fifth set of LIDAR data for each LIDAR profile with the test vehicle, wherein the fifth set of LIDAR data is used to detect a vehicular presence travelling in an opposite direction on the adjacent lane ahead of the test vehicle; and
receiving a sixth set of LIDAR data for each LIDAR profile with the test vehicle, wherein the sixth set of LIDAR data is used to detect a vehicular presence travelling in the opposite direction on the adjacent lane behind of the test vehicle.

5. The method of utilizing a LIDAR digital map to improve automatic driving, the method as claimed in claim 1 comprises the steps of:
(N) comparing a specific profile to each LIDAR classification with the automated driving system during step (J) in order to identify a matching classification from the plurality of LIDAR classifications, wherein the specific profile is from the plurality of LIDAR profiles;
(O) assigning the matching classification as the corresponding classification for the specific profile with the automated driving system, if the matching classification is identified by the automated driving system;
(P) appending the specific profile into the LIDAR classifications as a new classification with the automated driving system, if the matching classification is not identified by the automated driving system;
(O) assigning the new classification as the corresponding classification for the specific profile with the automated driving system, if the matching classification is not identified by the automated driving system; and
(R) executing a plurality of iterations for steps (O) through (Q), wherein the specific profile in each iteration is a different profile from the plurality of LIDAR profiles.

6. The method of utilizing a LIDAR digital map to improve automatic driving, the method as claimed in claim 5 comprises the steps of:
providing a matching threshold managed by the automated driving system;
assessing a profile-similarity score between the matching classification and the specific profile with the automated driving system; and
updating the matching classification with a modification based on the specific profile with the automated driving system, if-after the profile-similarity score is less than or equal to the matching threshold.

7. The method of utilizing a LIDAR digital map to improve automatic driving, the method as claimed in claim 1 comprises the steps of:
providing the at least one roadside device as a passive laser beam reflector;
propagating a scanning laser beam from the passenger LIDAR system, off the roadside device, and to the non-line-of-sight condition;
relaying echo-laser data of the non-line of-sight condition from the roadside device to the passenger LIDAR system;
compiling the echo-laser data into at least one target image of the non-line of-sight condition with the passenger LIDAR system; and
designating the target image as the hidden target data with the automated driving system during step (E).

8. The method of utilizing a LIDAR digital map to improve automatic driving, the method as claimed in claim 1 comprises the steps of:
wherein the at least one roadside device includes a roadside LIDAR device;

propagating a scanning laser beam from the roadside device to the non-line-of-sight condition;

capturing echo-laser data of the non-line of-sight condition with the roadside device;

compiling the echo-laser data into at least one target image of the non-line of-sight condition with the roadside device;

relaying the target image from the roadside device to the passenger LIDAR system; and designating the target image as part of the hidden target data with the automated driving system during step (E).

9. The method of utilizing a LIDAR digital map to improve automatic driving, the method as claimed in claim 1 comprises the steps of:

wherein the at least one roadside device includes a roadside camera device;

capturing videographic data of the non-line of-sight condition with the roadside device;

relaying the videographic data from the roadside device to the automated driving system; and designating the videographic data as part of the hidden target data with the automated driving system during step (E).

* * * * *